March 6, 1934.  W. N. THRALL  1,950,330
SIGNAL LIGHT FOR VEHICLES
Filed Sept. 9, 1931  2 Sheets-Sheet 1

Inventor
William N. Thrall
By
Attorney

March 6, 1934. W. N. THRALL 1,950,330
SIGNAL LIGHT FOR VEHICLES
Filed Sept. 9, 1931 2 Sheets-Sheet 2
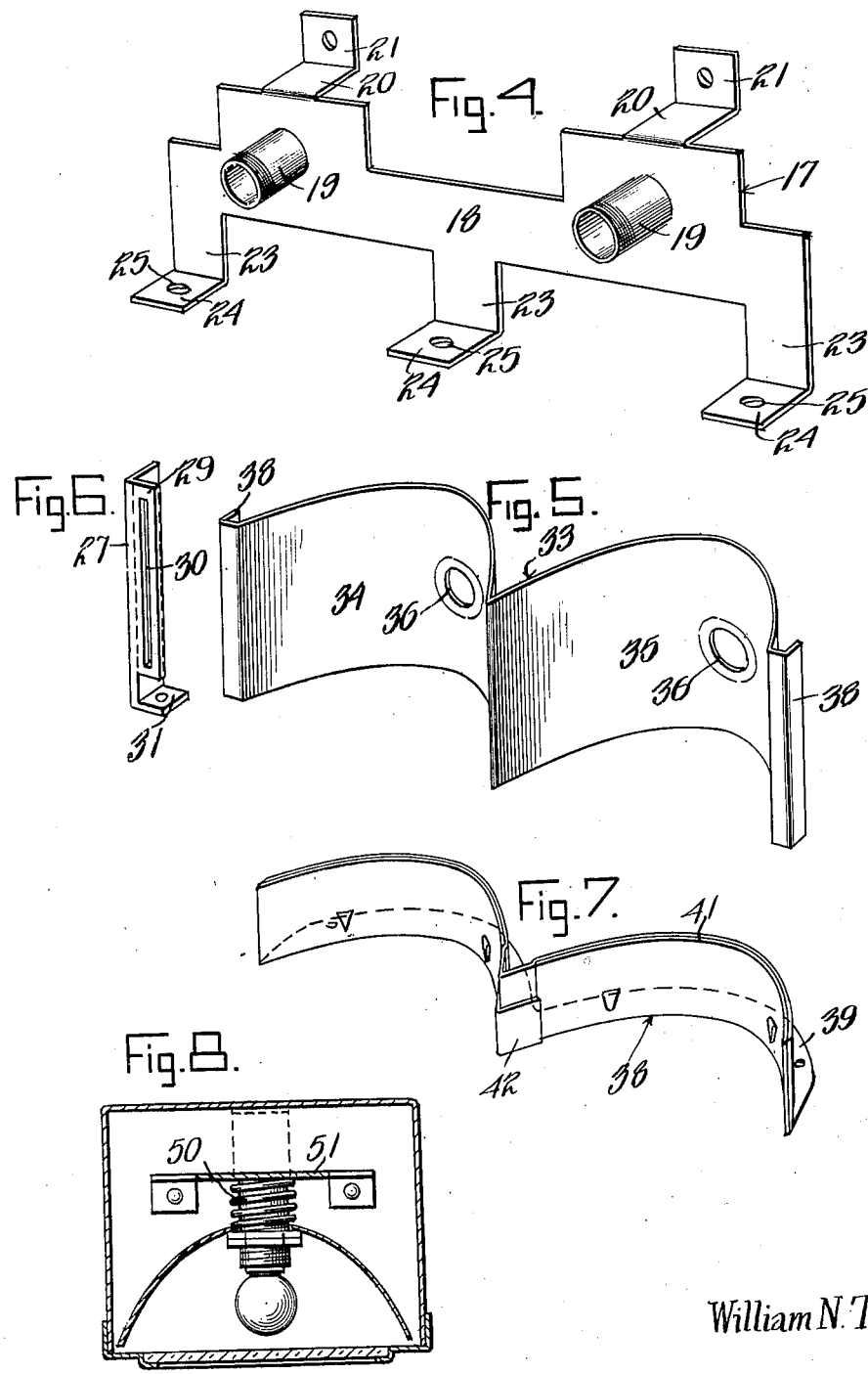
Inventor
William N. Thrall
By
Attorney Patented Mar. 6, 1934

1,950,330

UNITED STATES PATENT OFFICE 1,950,330

SIGNAL LIGHT FOR VEHICLES

William N. Thrall, West Rutland, Vt.

Application September 9, 1931, Serial No. 561,913

1 Claim. (Cl. 177—329)

This invention relates to signal lights particularly adapted for use on motor vehicles.

The object of the invention is to provide a simple, inexpensive and compact device, easily attached to such vehicles and which will serve as a means for readily indicating to operators of other vehicles the intended movements of the driver.

Another object is to provide a device which is clearly visible, both night and day, and one in which a positive signal may be clearly seen by drivers of approaching or following vehicles.

Figure 1:
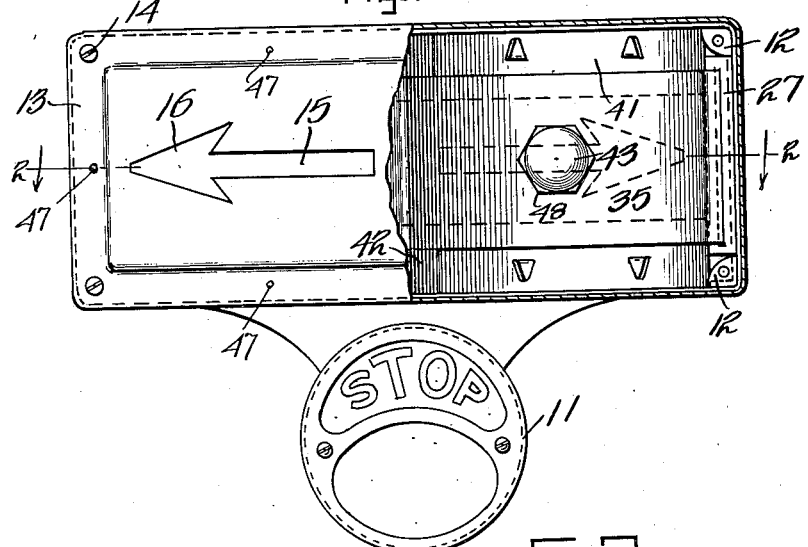
Figure 2:
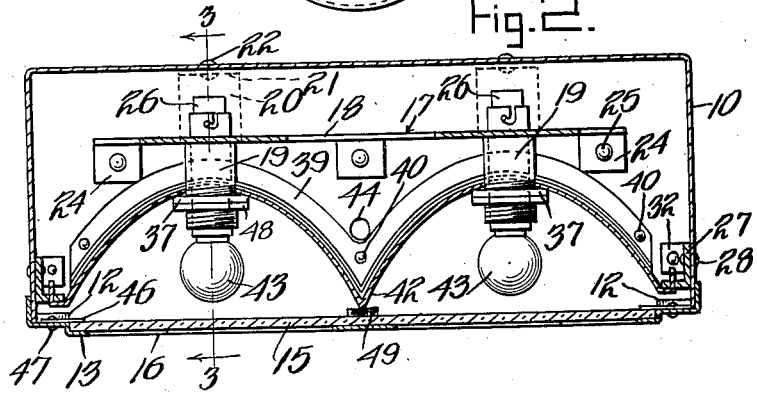
Figure 3:
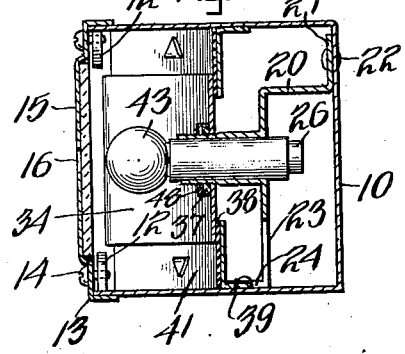

Referring to the accompanying drawings, which are made a part hereof and on which similar reference characters indicate similar parts, Figure 1 is a view in elevation of the device, partly in section, Figure 2, a section on line 2—2 of Figure 1, Figure 3, a section on line 3—3 of Figure 2, Figure 4, a perspective view of the lamp support, Figure 5, a perspective view of the reflector, Figure 6, a perspective view of the left bracket for the reflector, Figure 7, a perspective of the lower brace for the reflector, and Figure 8, a view of a modified form.

In the drawings numeral 10 indicates the outer casing of the lamp having a conventional rear and stop light 11 secured to the underside. The forward corners of the casing 10 are provided with lugs 12 to which the front plate 13 is secured by any suitable means, preferably screws 14.

The plate 13 is provided with a central opening in the form of arrows 16 and is further provided with a panel 15 of glass or any other suitable light transmitting material secured to the inner side by means of cleats 46 fixed on the plate 13 and riveted at 47. The arrows are so arranged as to point to the right and left from the center and preferably of a length substantially equal to one-half of the length of the plate 13.

A bracket 17 shown in Figure 4 comprises a flat plate 18 having socket tubes 19 projecting therefrom. The front end of the socket tubes are screw threaded. The plate 18 is further provided with rearwardly projecting legs 20 having vertically extending lugs 21 adapted to be secured to the rear casing wall by rivets 22. The plate 18 is also provided with depending legs 23 having horizontally extending lugs 24 adapted to be secured to the bottom casing wall by rivets 25. The plate 18 being spaced from the rear casing wall a distance equal to the length of the legs 20 thereby forming a space in which connections not shown may be made to the contact plugs 26 in the socket tubes 19.

To the inner ends of the casing 10 flanged brackets 27 are secured by means of rivets 28. The inwardly projecting flange portion 29 is provided with an elongated slot 30. The brackets 27 are also provided with horizontally extending lugs 31 secured to the bottom of the casing by rivets 32.

A reflector 33 is formed of a pair of concaved surfaces 34 and 35 providing individual reflecting portions for the bulbs 43 positioned in rear of each of the arrows 16. The center portion of each reflector portion has an opening 36 through which the socket tube 19 extends. The surface around the opening is flattened to receive a nut 37 and lock nut 48 turned on the screw thread socket tube 19. The outer ends of the reflector are flat and are provided with rearwardly extending flanges 38 adapted to engage in the slots 30 of the brackets 27. The reflector is held in position by the pressure of the nuts 37 and the flattened surfaces.

Reflector braces 38 conforming to the concaved portions 34 and 35 are secured adjacent and in rear of the reflector 33. The braces 38 are secured to top and bottom of the casing by horizontally projecting flanges 39 riveted at 40. The front side of the supports may be faced with rubber 41 or any suitable material serving as a cushion for the reflector 33 to rest against. The center of the reflector 33 is supported by plate 42 shown in Figure 7.

The sockets 19 are provided with conventional light bulbs 43 and the opening 44 indicates an outlet for the wiring connections, not shown.

A vertical strip of felt or similar material 49 may be mounted on the inside of the glass to prevent leakage of light from one side of the casing to the other, as shown in Figure 2.

Any suitable means, not shown, may be used to cause the bulbs to be illuminated. For example, suitable contacts or switches may be mounted on the steering wheel or shaft or on the dash and upon actuating the same the proper signal may be made, the operation of which to say the least is very simple, and easily understood.

The device as described is simple in construction, rigid, and well re-enforced by the manner of mounting the reflector and the support for the light bulbs.

As will be seen the device may be attached to any one of various parts of a vehicle and serves as a means of positively signaling to other vehicle drivers the contemplated movements of the operator of such equipped vehicles. If desired a single arrow may be substituted for the double arrows shown in Figure 1 without substantial changes in the construction.

Figure 8 illustrates a single lamp and reflector construction, which may be desired in some instances. It also shows the reflector held against the adjustable jamb-nuts on the socket tube by a spring 50 surrounding said tube and at its other end bearing against a bracket 51.

It will be obvious to those skilled in the art that various changes may be made in the details of construction of my device without departing from the spirit of the invention and therefore I do not limit myself to what is shown in the drawings and described in the specification except as indicated by the appended claim.

Having thus fully described my said invention, what I claim as new and desire to secure by Letters Patent is:

A signal lamp for vehicles comprising a casing, brackets having slotted flanges positioned at each side of said casing, braces secured to the top and bottom of said casing, a reflector formed of a flat plate having concave portions intermediate its ends, the ends of said plate being bent rearwardly to engage in said slotted flanges, and said braces having a shape corresponding to that of the reflector whereby the top and bottom edges of the reflector rest against said braces, said reflector being further provided with openings therein, socket tubes mounted in said casing projecting through said openings, bulbs mounted in said tubes, and means surrounding said tubes for holding said reflector in fixed position in said brackets and against said braces, substantially as set forth.

WILLIAM N. THRALL.